Dec. 6, 1938.  L. BODDY  2,139,440
ELECTRICAL INDICATING SYSTEM AND APPARATUS
Filed Sept. 15, 1936  2 Sheets-Sheet 1
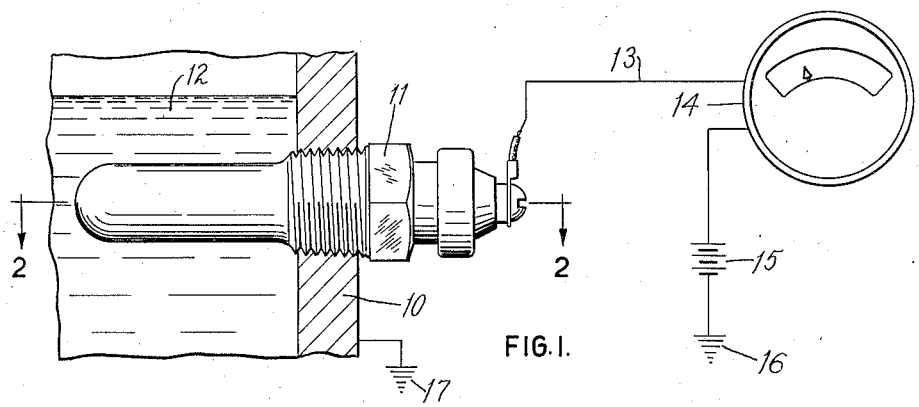
FIG. I.
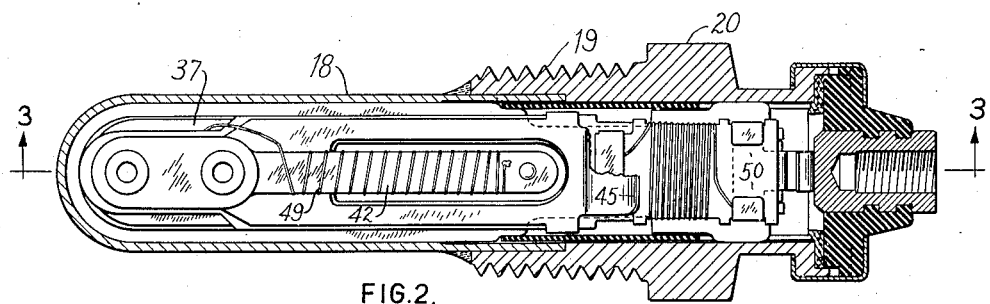
FIG. 2.
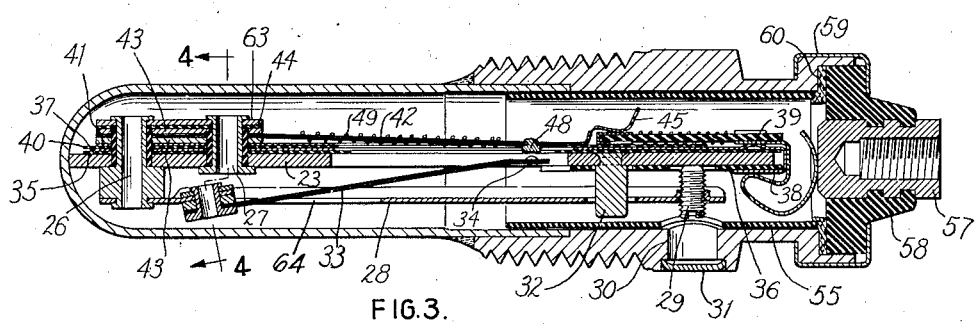
FIG. 3.
LEONARD BODDY, INVENTOR.
BY Slough & Canfield,
ATTORNEYS.

Dec. 6, 1938.   L. BODDY   2,139,440
ELECTRICAL INDICATING SYSTEM AND APPARATUS
Filed Sept. 15, 1936   2 Sheets-Sheet 2

INVENTOR.
LEONARD BODDY.
BY Slough + Canfield,
ATTORNEYS

Patented Dec. 6, 1938

2,139,440

UNITED STATES PATENT OFFICE 2,139,440

ELECTRICAL INDICATING SYSTEM AND APPARATUS

Leonard Boddy, Ann Arbor, Mich., assignor to The Anderson Company, Gary, Ind., a corporation of Indiana Application September 15, 1936, Serial No. 100,916

7 Claims. (Cl. 200—122)

This invention relates to electrical indicating systems and apparatus, and more particularly to the transmitting or sending units of such systems.

I am familiar with electrical indicating systems comprising a transmitter or a sending unit actuated by changes in temperature, oil pressure, liquid level and the like adapted to transmit a current of varying intensity or a series of current pulsations of varying cumulative value in a given interval to an indicating unit at a remote point.

Heretofore, transmitters for a temperature indicating system have been employed wherein a plug element is adapted to contact a liquid whose temperature is to be indicated and an expansible element is associated with the plug element having a different coefficient of expansion from the plug element whereby the plug element and expansible element will contact upon an increase or decrease of temperature permitting an electric current to traverse a heating means associated with either the plug or expansible element to effect increased expansion of one of the elements and break the contact.

Thus, a series of current pulsations whose cumulative value in a given interval is proportional to the ambient temperature are transmitted to the indicating unit at the remote point. However, transmitters of this type require accurate positioning of the expansible element relative to the plug and also maintenance of this position to give an accurate temperature indication. It is relatively difficult in the commercial production to determine the proper relative position of these elements without considerable adjustment and testing of the completed unit and it is difficult to maintain a proper initial relation when the apparatus is subjected to the vibration commonly encountered in automobile vehicles.

Additionally, it is desirable that only a relatively small amount of current be used in operating indicating apparatus of this type with the result that the part must be compactly arranged and of minimum weight to be responsive to small variations in current.

Due to the commercial tolerances in the physical properties and size adjustment means must be provided to effect the proper indication and which adjustment means should be relatively simple and lend itself to quantity production. Additionally, the parts must be so mounted as to avoid injuring by considerable vibrations.

I have devised a transmitter adapted to an electrical temperature indicating system wherein accurate calibration may be simply and efficiently effected and wherein the parts are compactly arranged while minimizing any tendency to injury due to vibration.

It is an object of my invention therefore to provide an electrical transmitter for temperature indicating systems which can be simply and easily adjusted to effect proper indication.

Another object of my invention is to provide an electrical transmitter for temperature indicating systems which is simple in construction and which does not require frequent readjustment.

Another object of my invention is to provide an electrical transmitter for temperature indicating systems, wherein the parts are compactly mounted and may be subjected to considerable vibration without injury.

Another object of my invention is to provide an electrical transmitter for temperature indicating systems which is relatively economical to manufacture and assemble and lends itself to quantity production.

Another object of my invention is to provide a plug type transmitter in an electrical transmitting system wherein the mechanism parts are insertable into the plug as a unit and calibrated prior to inserting within the plug.

Other objects of my invention and the invention itself become increasingly apparent from a consideration of the following description and drawings, wherein:—

Fig. 1 is a diagrammatic view of an electrical indicating system for the cooling water of an automotive vehicle engine embodying my invention;

Fig. 2 is a longitudinal sectional view of a plug element taken along the line 2—2 of Fig. 1;

Fig. 3 is a longitudinal sectional view taken along the line 3—3 of Fig. 2;

Figure 5:
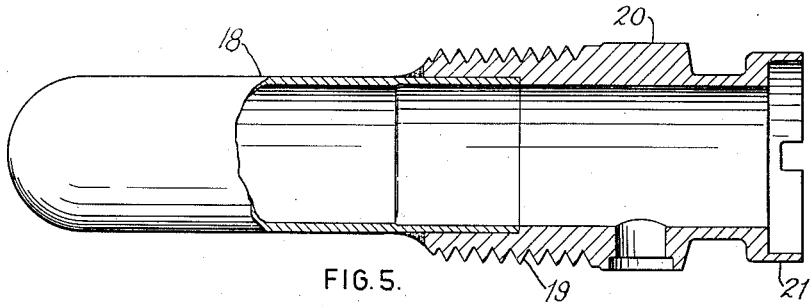
Fig. 5 is a view of the plug element of Fig. 1 partly in section and with the mechanism parts within the plug element removed.

Referring now to the drawings, I have indicated at 10, a portion of the jacket wall of an automotive vehicle engine having a plug type transmitter 11 mounted therein with a portion of the plug projected into the cooling water 12 of the circulatory cooling system for the engine.

In a manner to be hereinafter described, the transmitter 11 is adapted to send a series of current impulses through a wire 13 to indicating device 14 mounted on the vehicle dash board to cause an indicating hand to move over a dial in correspondent variation in temperature of the cooling water.

The electro-responsive device is connected in series with a source of power such as a battery 15 and a ground connection 16. The circuit is completed by a ground connection 17. The manner of installing an apparatus of this type on an automotive vehicle is well known and a further description is not believed necessary other than the operation of the transmitting unit 11 to control current flow through the circuit.

The indicating unit 14 may be of any suitable type which will give an indication of current variation or the cumulative heating value of a series of current impulses, one such unit being illustrated in my copending application Serial No. 100,917, filed September 15, 1936.

The plug element is shown separately in Fig. 5 and with operating parts within the plug removed. The plug element is generally tubular in form with a closed end and comprises a portion 18 adapted to contact the cooling liquid, an externally threaded portion 19 seatingly engageable with a threaded bore provided therefor in the jacket wall 10, a hexagonal shoulder portion 20 engageable with a wrench or the like for rotating the plug, the internal diameter being substantially uniform with the exception of an enlarged end portion formed by an annular flange 21.

The plug is formed of suitable heat conducting material such as brass whereby the temperature internally of the plug will be substantially that of the cooling liquid.

Figure 6:
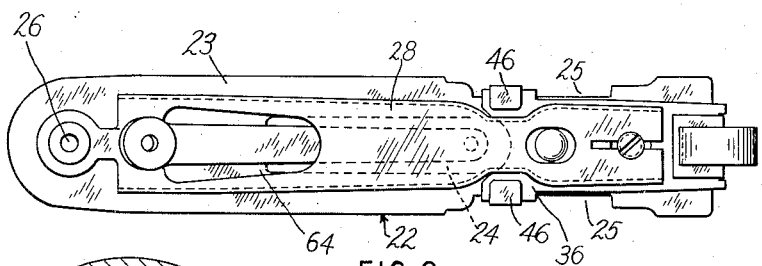
Fig. 6 is an elevational view of a mechanism unit insertable within the plug element.
Figure 4:
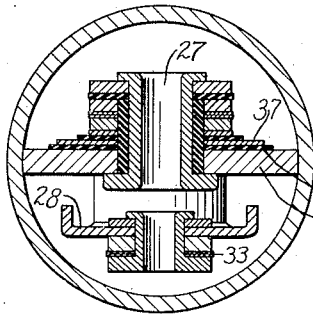
Fig. 4 is a transverse sectional view taken along the line 4—4 of Fig. 3.
Figure 8:
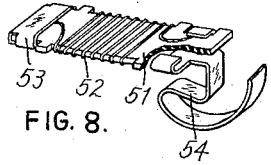
Fig. 8 is a perspective view of a shunt member which I employ.

A mechanism unit 22 is separately illustrated in Fig. 6, the mechanism unit being adapted to be disposed within the plug as a complete unit and the functioning of the unit is independent of relative expansion or contraction of the plug. The unit comprises an oblong plate 23 formed of brass or similar material and of a width so that its lateral edges engage the inner walls of the plug, the plate being provided with a central elongated perforation 24 and laterally inset portions 25—25. The plate 23 forms a mounting for a plurality of longitudinally extending bi-metallic elements, contact strips, and intermediate fibre or the like insulating strips. The plate 23 is provided at spaced points for the reception of generally tubular metal pins 26 and 27, headed over for retention of the aforementioned elements and strips with the plate. As best illustrated in Figs. 3 and 6, a relatively resilient copper or the like longitudinal element 28 is secured to pin 26 by one end and the opposite end of the element 28 being adjustably movable. The free end of the element 28 is threaded for the reception of an adjustment screw 29 which engages the plate 23 permitting the free end of the element 28 to be moved relative to the plate 23 by rotation of the screw 29. The plug is provided with a lateral perforation 30 permitting access to the screw 29 for adjustment of the element 28 after the mechanism unit has been assembled with the plug and upon proper adjustment the perforation may be closed by a cap 31.

In order to insure the element 28 being mounted in proper alignment a pin 32 is secured to the plate 23 and projects through a perforation provided in element 28. The element 28 provides a mounting for a bimetallic element 33 having a contact 34 at its free end, the element 28 being perforated, as indicated at 64, permitting the bimetallic element to be projected through its supporting element 28. It will now be understood that as the element 28 is moved by adjustment of the screw 29 that the bimetallic element 33 including its contact 34 will be correspondingly moved or adjusted.

Abutting the opposite face of the plate 23 is a longitudinally perforated fibre or the like insulating strip 35 which together with a relatively short strip 36 maintains a relatively thin conducting strip 37 insulated from plate 23, the conducting strip having a hook end portion 38 and having a hump 39 thereon to tightly engage a shunt unit to be later described. (See also Fig. 7.)

A second fibre or the like insulating strip 40 abutting the conducting strip 37 maintains a second conducting strip 41 insulated from the first conducting strip 37 and also from plate 23. A second bimetallic element 42 is gripped between relatively short metal plates 43—43, one of the plates 43 abutting the conducting strip 41 whereby the bimetallic strip 42 is in circuit with conducting strip 41. A fibre insulating plate 44 and a top plate 63 which engages the headed portions of pins 26 and 27 complete the mounting arrangement, and fibre or the like insulating sleeves encircling the pins 26 and 27 maintain the conducting strips 37 and 41 and also the bimetallic element 42 out of contact with the pins 26 and 27 and, consequently, plate 23.

The opposite end of conducting strip 41 is formed with a resilient finger 45, adapted to engage a shunt unit to be hereinafter described and also with a pair of lateral ears 46—46 which are bent to grip insulating strip 36.

The bimetallic element 42 is provided with a contact 48 at its free end adapted to engage contact 34 of bimetallic element 33 in a manner to be hereinafter described, the bimetallic element 42 having a heating coil 49 wound therearound, one end of the heating coil contacting the element engaged at contact 48 and the opposite end of the heating coil engaging conducting strip 37.

Figure 7:
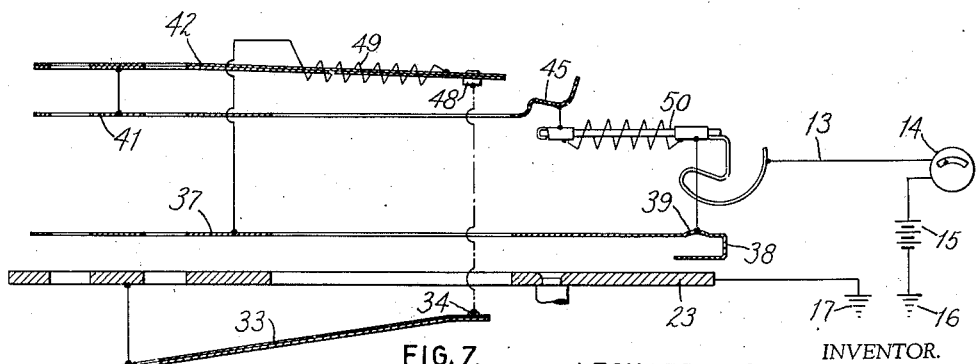
Fig. 7 is a diagrammatic view of the circuit connection for the system illustrated in Fig. 1.

Referring now to Figs. 3 and 7, it is to be noted that the bimetallic element 33 has a free end supported length greater than the free end supported length of bimetallic element 42 and consequently will warp to a greater degree responsive to thermal change bringing the contact 34 and at 48 into engagement, and for the purpose of testing the mechanism unit 22 prior to insertion within the plug plate 23 is grounded as indicated at 17, and the wire 13 leading from the indicating unit 14 is connected directly with the hooked end 38 of conducting strip 37.

The indicating hand is then set to give the correct reading for zero temperature and a reading is taken at the maximum reading on the scale, the current passed being through the ground 17, plate 23, bimetallic element 33, contacts 34 and 48, bimetallic element 42, and through heating coil 49 to conducting strip 37, then through wire 13 to the indicating unit 14, battery 15 and the current through ground 16.

The contact will be engaged due to the greater warping of the element 33 until sufficient heat is generated by the current traversing heating coil 49 to cause greater warping of bimetallic element 42 separating the contact and the greater the ambient temperature the greater will be the heat required to warp bimetallic element 42 sufficiently to disengage the contact. Thus, on a given interval a greater amount of current or greater cumulative value of current impulses will be sent to the indicating unit 14.

The parts of the mechanism unit are so designed that at the maximum desired ambient temperature indicated the indicating hand will under-read requiring additional current to be sent to the indicating unit. This is effected by the provision of a shunt unit which comprises the fibre insulating grip 51 having a wire 52 wound therearound with one end of the wire engaging a contact 53 and the opposite wire end engaging a hooked form contact 54. The shunt unit 50 snaps into place with the contact 53 engaging the finger 45 and conducting strip 41 and contact 54 engaging the hooked end portion of conducting strip 37, whereby it will be observed that a portion of the current will be shunted around the heating coil 49 by passing through bimetallic element 42 thence to conducting strip 41 through the shunt unit 50 to the indicating unit 14. The shunt unit 50 has a pre-selected resistance value so as to effect a slight over-reading of the indicating hand at the maximum temperature scale reading and the mechanism unit 22 together with the shunt unit 50 is placed within the plug with the plate 23 engaging the inner walls of the plug.

A sleeve of insulating material 55 is disposed within a portion of the plug to insure that the mechanism unit part encircled thereby will be maintained out of contact with the plug. A cap including a terminal 57 mounted in an insulating block 58 is then affixed to the plug by spinning over the end portion of a thin metal tube 59 to grip the cap 58 and shoulder portion of flange 21 of the plug. A sealing washer 60 may be disposed intermediate the block 58 and the plug to prevent ingress of foreign material and the like. After the parts have been thus assembled the screw 39 is rotated to adjust the relative positioning of contacts 34 and 48 to give the proper indication of maximum temperature.

Although I have shown and described a preferred embodiment of my invention, it is understood that numerous and extensive departures may be made therefrom without departing from the spirit of my invention and the scope of the appended claims.

Having thus described my invention, what I claim is:

1. A transmitter for an electrical indicating system adapted to be placed in circuit with a source of power and an indicating device, said transmitter comprising a heat conducting plug element adapted to contact a fluid whose temperature is to be indicated whereby the plug interior will be substantially the temperature of the fluid, a pair of bi-metallic elements in the plug, each having a free end portion differentially responsive to equal thermal change, a contact on each of the free end portions, a heating coil associated with one of said elements whereby upon engagement of the contacts current will traverse the elements and the heating coil to cause the oil heated element to disengage the contacts thereby effecting a series of current impulses whose cumulative value in a given interval is in correspondence with a given ambient temperature, and a unit detachably clipped in place adapted to divert a portion of the current around the heating coil and having a terminal adapted to connect the indicating unit in circuit with the heating coil.

2. A transmitter for an electrical indicating system adapted to be placed in circuit with a source of power and an indicating device, said transmitter comprising a housing, a pair of thermostatic elements within the housing each responsive to a different degree to equal thermal change and so placed relative to each other that one element will overtake the other and complete an electrical circuit, supplemental electrical heating means associated with the lesser moving element energized when the elements are engaged, the supplement heating causing increased movement of the element provided with the heating means to effect disengagement of the elements to break the circuit whereby a series of current pulsations will traverse the circuit having a cumulative value corresponding to the position of the normally greater moving element, and means for bodily moving one of said pair of thermostatic elements relative to the other to variably alter the effect of a given supplemental heating value.

3. A transmitter for an electrical indicating system comprising a tubular heat conducting plug having a closed end and adapted to contact a fluid whose temperature is to be indicated, a pair of relatively insulated bimetallic elements within the plug having each a free end portion, cooperating electrical contacts on each of said end portions adapted when engaged to complete an electrical circuit, a first of said elements having a greater response to thermal change than the second element effecting engagement of the contacts, a heating coil associated with the second element adapted when energized by engagement of the contacts to effect increased movement of the second element to disengage the contacts whereby the contacts will be intermittently engaged permitting a series of current pulsations to traverse the circuit, and means accessible externally of the plug for relatively adjusting the contacts to vary the heating effects required to separate the contacts.

4. In an electrical transmitter for temperature indicating systems, the combination with a hollow plug of heating conducting material adapted to be projected into a fluid whose temperature is to be indicated, of a mechanism unit insertable within the plug adapted to provide a series of current pulsations for an indicating unit when connected in circuit therewith, the unit comprising a plate making contact with the plug, a bimetallic element supported by the plate at one end and having an electrical contact at its free end, means operable externally of the plug for adjusting the free end of the element and its associated contact, a second bimetallic element supported by the plate at one end and insulated therefrom and the first element, the second element having a contact associated with its free end portion engageable with the contact of the first element, a heating coil encircling the second element adapted to be energized by engagement of the contacts, the first element having a greater response to a given thermal change than the second element to effect engagement of the contacts, the heating of the second element by the coil effecting disengagement of the contacts, and detachable shunt means adapted to shunt current around the heating coil to lessen the heating effect of said coil and having a terminal adapted to connect the heating coil with an external circuit.

5. In an electrical transmitter for temperature indicating systems, the combination with a hollow plug of heat conducting material adapted to be projected into a fluid whose temperature is to be indicated, of a removable mechanism unit insertible within the plug adapted to provide a series of current pulsations for an indicating unit when connected in circuit therewith, the unit comprising a perforated plate contacting the inner walls of the plug, a resilient element supported at one end by the plate and having an opposite free end, adjusting means for positioning said element, a pair of bi-metallic elements, one bi-metallic element being rigidly supported at an end by the resilient element and movable therewith and its opposite end being freely movable and extending within the plate perforation, said bi-metallic elements disposed on opposite sides of the plate, and the second bi-metallic element having an end affixed to the plate and having a contact engageable with a contact of the first bi-metallic element, one of said bi-metallic elements being greater in length than the other bi-metallic element and having a greater response to an increase in ambient temperature to cause engagement of the contacts of said elements, a heating element adjacent the shorter bi-metallic element, and electrical circuit conductors connecting said contacts and heating element in serial circuit whereby the heating element will be energized upon engagement of the contacts to heat the shorter bi-metallic element and effect disengagement of the contacts providing a series of current pulsations.

6. In an electrical transmitter for temperature indicating systems, a combination with a hollow plug of heat conducting material adapted to be projected into a fluid whose temperature is to be indicated, of a mechanism unit insertible within the plug adapted to provide a series of current pulsations for an indicating unit when connected in circuit therewith, the unit comprising a centrally perforated plate conforming generally to the inner walls of the plug and in contact therewith, a resilient element supported by one end by the plate and having an opposite free end, adjusting means for moving the element relative to the plate, a pair of bi-metallic elements, one being supported at an end by the resilient element and having its opposite free end extending within the plate perforation, said bi-metallic elements disposed on opposite sides of the plate and the second having an end affixed to the plate and having contact engagement with the first said bi-metallic element, the second bi-metallic element being less responsive to an increase in ambient temperature to cause engagement of the contact of said element, a heating element adjacent the said bi-metallic element, and electrical circuit conductors connecting said contacts and heating elements in serial circuit whereby upon engagement of the contacts a portion of the current will traverse the heating element, and means for inserting a variable resistance in circuit to shunt current around the heating element to vary the relative amount of current traversing the heating element to calibrate the transmitter, and a cap maintaining the plate in inserted position locked with the plug and provided with a contact engaging the circuit conductors.

7. An electrical transmitter comprising a hollow plug of heat conducting material, a mechanism unit detachably insertible within the plug, said unit comprising a pair of bi-metallic elements differentially responsive to thermal change and having free end portions engageable to complete an electrical circuit, a heating coil thermally associated with the least responsive of said elements, a detachable shunt unit adapted to divert current around the heating coil with the bi-metallic elements engaged, means accessible externally of the plug for bodily moving one of said elements to alter the relation of the free end portions of the elements, and the shunt unit including a contact adapted to connect the heating coil with an external circuit.

LEONARD BODDY.